May 23, 1944.　　　　D. F. GOOD　　　　2,349,262
PEANUT PICKING MACHINE
Filed Aug. 3, 1940　　　　5 Sheets-Sheet 4
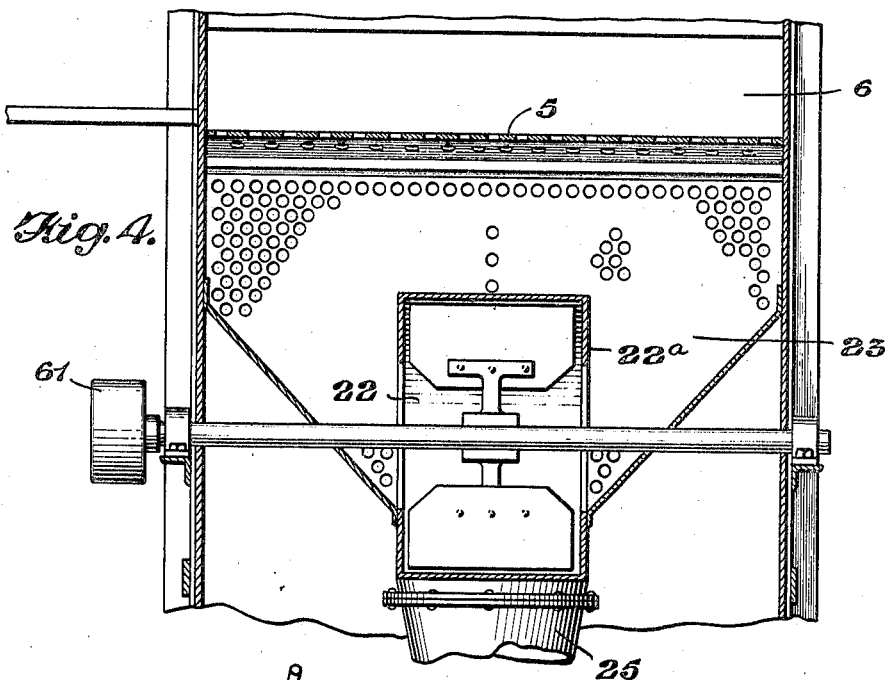
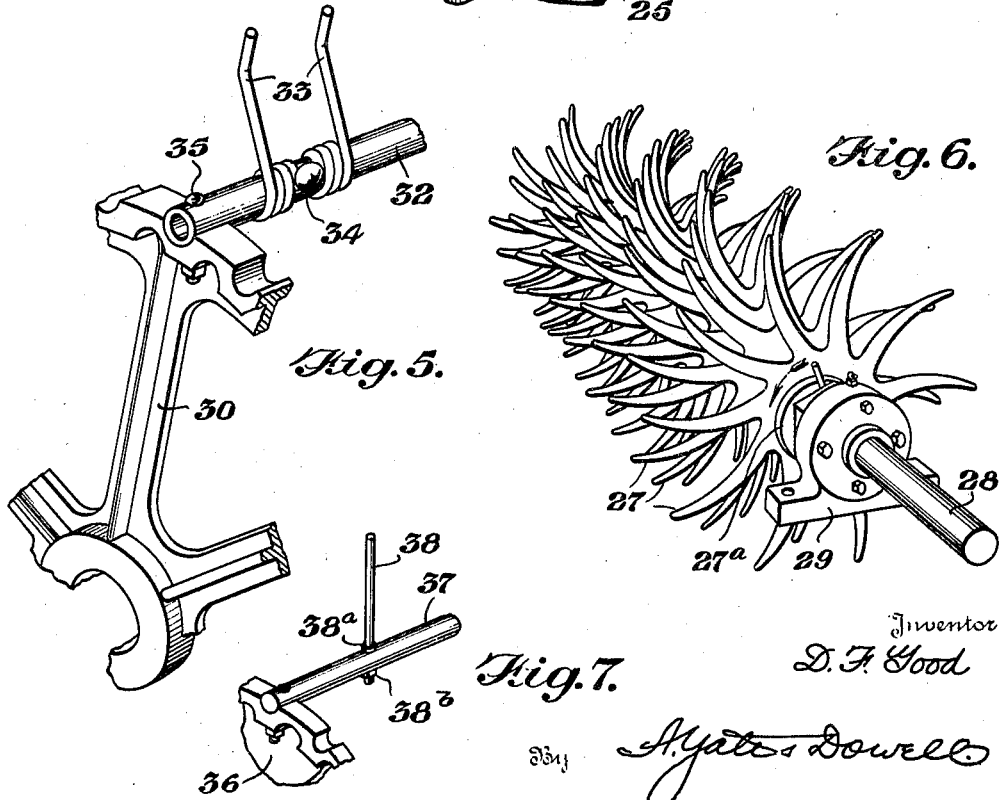

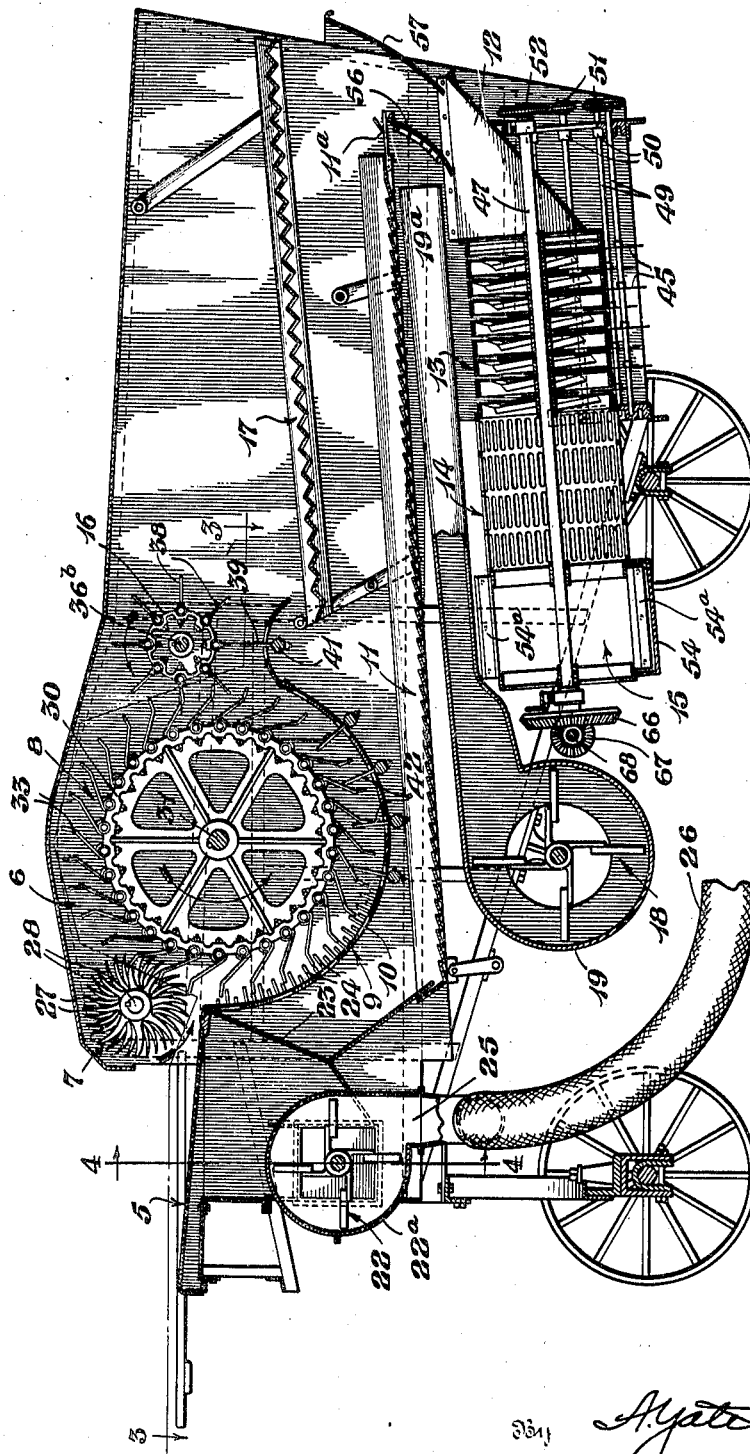

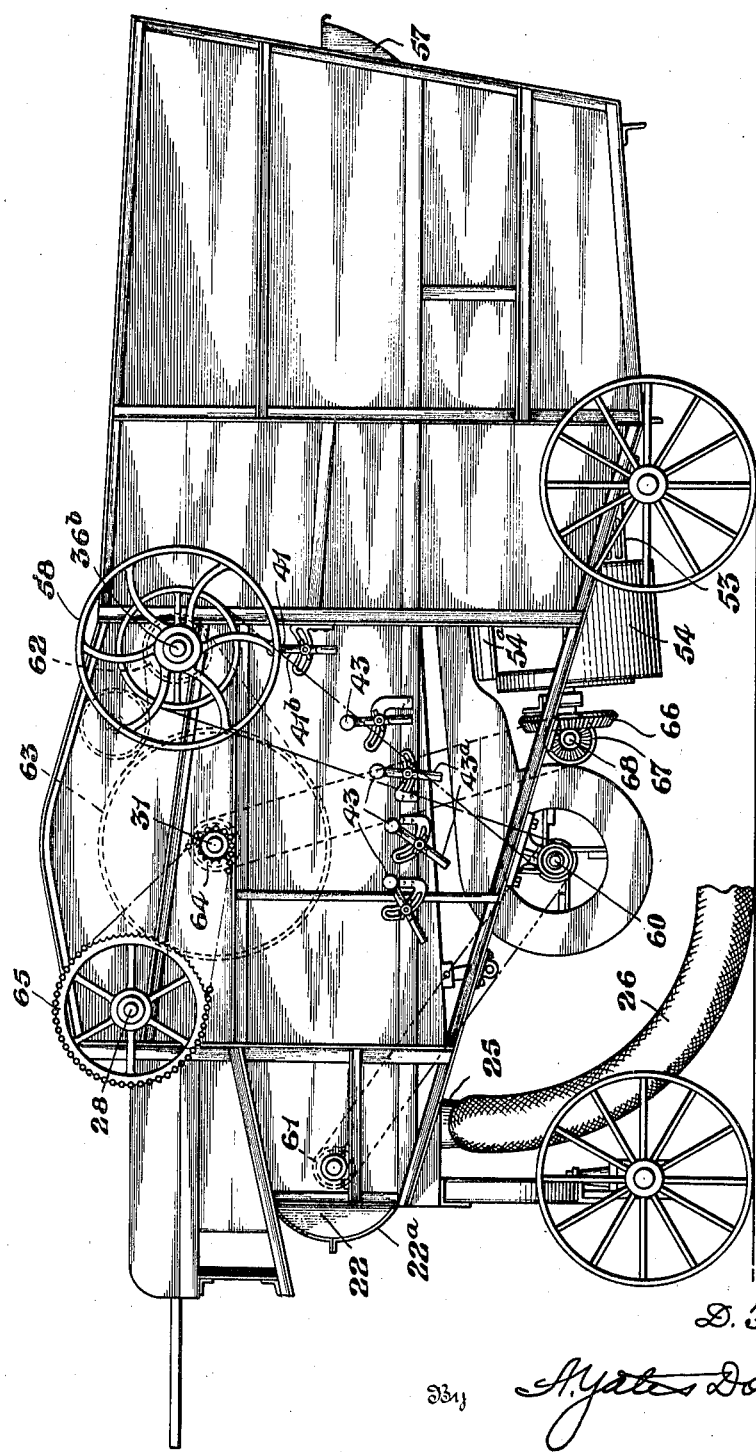

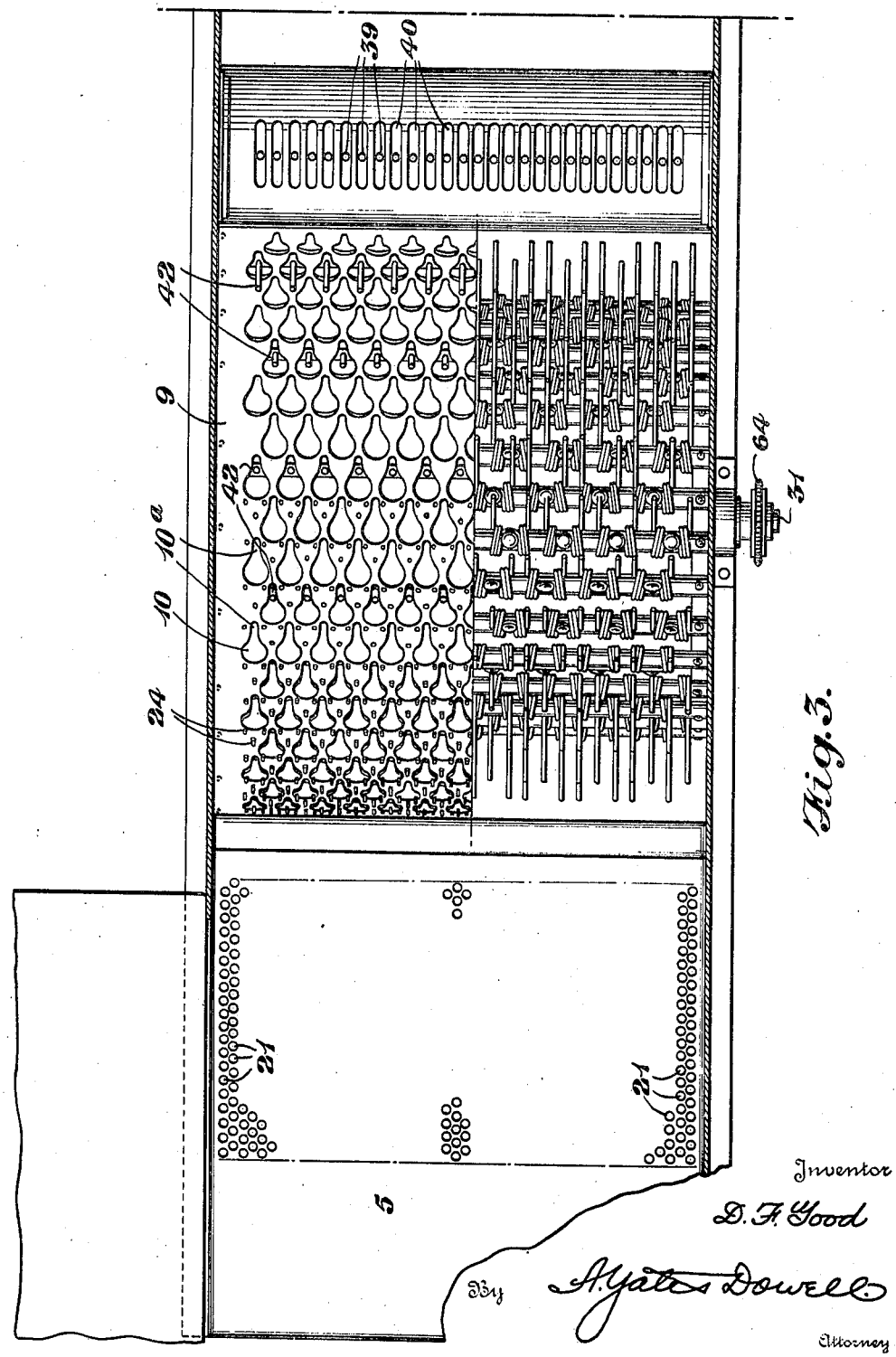

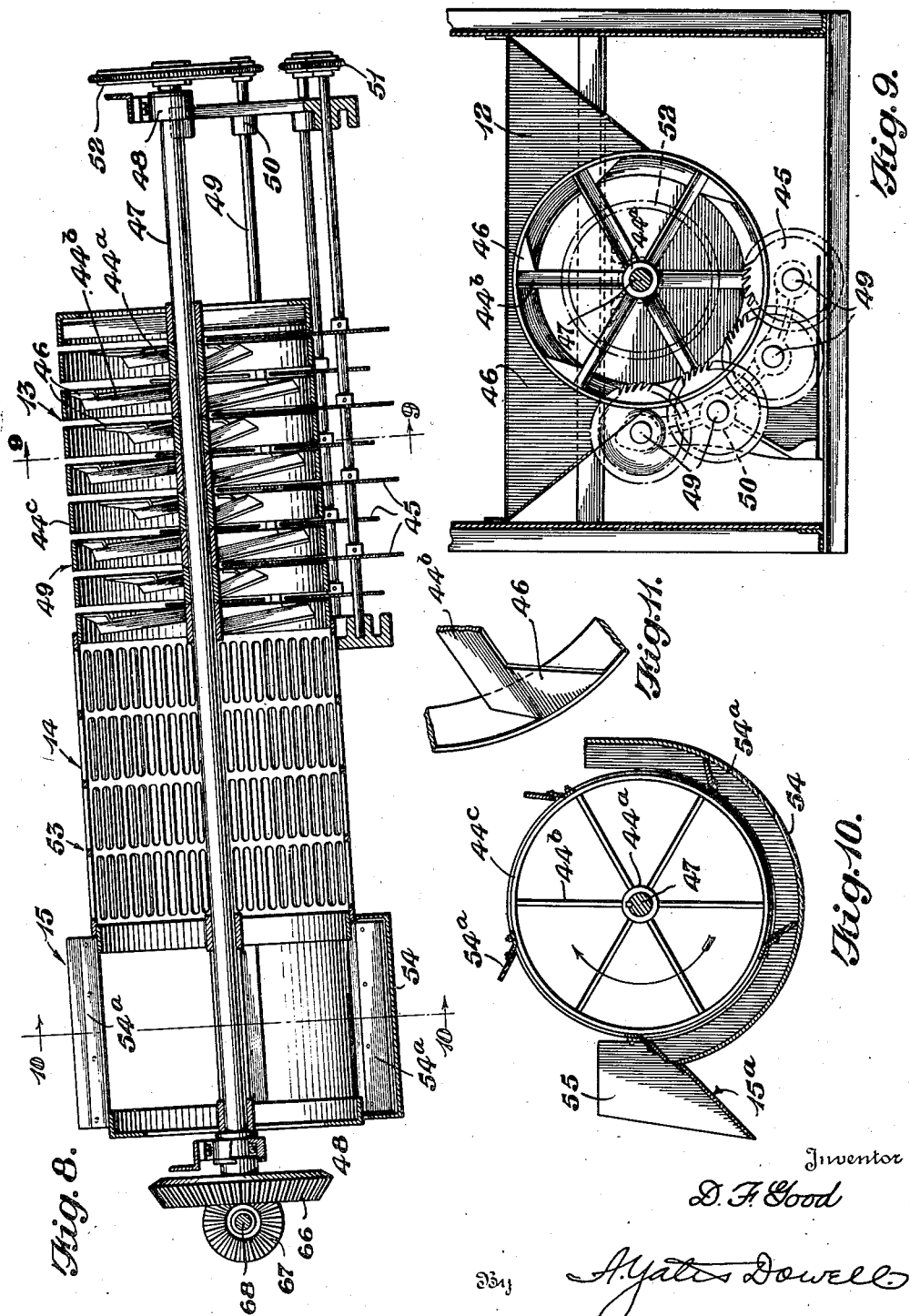

Patented May 23, 1944

2,349,262

UNITED STATES PATENT OFFICE 2,349,262

PEANUT PICKING MACHINE

Daniel F. Good, Waynesboro, Pa., assignor to Frick Company, Waynesboro, Pa., a corporation of Pennsylvania Application August 3, 1940, Serial No. 350,511

8 Claims. (Cl. 130—30)

This invention relates to improvements in peanut picking machines.

The principal objects of the invention are to generally improve the efficiency and operating conditions of machines of this type, while at the same time maintaining the cost of manufacture within a moderate price range, and the features whereby these objects are accomplished include:

Means whereby a major portion of the dust and dirt is removed from the vines and conducted clear of the machine and operator or operators before the vines advance any material distance into the machine, preferably at the feeding position before and after the vines enter the feeding cylinder, thereby improving working conditions and avoiding clogging of the working parts of the machine with dust and dirt and resultant rapid wear and deterioration on bearings and other moving parts;

A means for subjecting the vines to the action of the picking cylinder whereby the nuts are removed from their stems with a high degree of efficiency and a minimum of damage to the nuts while being removed;

An improved type of stripping screen or concave coacting with the picking cylinder and so constructed and arranged as to most effectively assist in removing the nuts from the vines;

A feeding cylinder so constructed as to ensure a gradual and even feeding of the vines to the picking and stripping cylinders;

A picking cylinder embodying picking fingers of a particularly advantageous type and otherwise constructed with a view toward simplicity combined with strength and long satisfactory service;

An improved stripping cylinder of rigid, sturdy yet simple construction;

Highly efficient dust and dirt removal throughout the entire picking operation;

And other important features of novelty and advantage which will be rendered apparent in view of the following description taken in conjunction with the drawings, wherein:

Fig. 1 is a longitudinal sectional view of a peanut picker or picking machine constructed in accordance with the features of the present invention;

Fig. 2 is a view in side elevation thereof;

Fig. 3 is a section line view showing in top plan part of the picking cylinder and the concave or stripping screen therebelow, the view being taken substantially on the line 3—3 Fig. 1;

Fig. 4 is a view in section taken substantially on the line 4—4 Fig. 1;

Fig. 5 is a fragmentary perspective view of a portion of the picking cylinder;

Fig. 6 is a detail perspective view of the feeding cylinder;

Fig. 7 is a detail fragmentary view of the stripping cylinder;

Fig. 8 is a view in longitudinal section of the cleaning and stemming drum and coacting parts;

Figs. 9 and 10 are views in section taken respectively on the lines 9—9 and 10—10 Fig. 8; and Fig. 11 is a fragmentary perspective view of a portion of one of the small drums or wheels constituting part of the stemmer drum.

First, referring to the parts of the machine generally as shown in Figs. 1 and 2, the vines, when fed into the machine, are disposed on a hand feed table 5 and progressed into the head chamber, generally indicated at 6, where they are taken by feeding cylinder 7 (rotating anti-clockwise as viewed in Fig. 1) and carried around to picking cylinder 8, rotating in the same direction as and at a predetermined speed with respect to the feeding cylinder for a purpose to be described in connection with the operation of the machine. Below the picking cylinder is a stripping screen or concave 9, the nuts falling through openings or perforations 10 having a particular contour to more effectively perform their function and then onto a pan 11, which advances the nuts rearwardly and drops them through separation fingers 11a into a hopper 12 from which they pass into a cleaning and stemming drum 13, thence through a final cleaning cylinder 14 rotating with the drum 13 and into a delivery section 15 which delivers to a hopper 15a.

The vines are taken by stripping cylinder 16 and thrown onto vine rack 17 and discharged thereby from the rear end of the machine for bailing, any nuts carried with the vines falling through the rack onto pan 11.

Below the pan 11 is an air blast unit including cleaning fan 18 operating in a housing 19 terminating in air duct 19a.

Referring now to the more detailed construction of the machine and the advantages derived therefrom it will be noted in Fig. 3 that the feeding table 5 is of open construction or formed with perforations 21, so that as the vines are fed into the head chamber 6 they will be subjected to the suction action of a dust collector or suction fan 22, note particularly Figs. 1 and 4. The housing 22a of this fan is in suction communication with the feeding board or chute 5 and also with a portion of the concave 9, a screen or openwork partition 23 being interposed between the concave and the fan. Thus, the suction fan draws the dust and dirt from the vines as they move over the feed table 5 and also during the initial stripping operation when they are acted on by the teeth of the picking cylinder 8 and coacting pins 24 of the concave 9, the dust being discharged through a conduit 25 and thence into a flexible conduit 26, which may extend along the ground such distance as will ensure clearance of the dust down wind. By means of this construction, the major portion of the dust and dirt is removed from the vines before the latter advance any material distance into the machine, thereby greatly minimizing the chances of clogging moving parts and wear on bearings. It will be noted that the suction action of the fan 22 is exerted through the partition 23 and concave 9 throughout the chamber 6 in which the picking cylinder and coacting feeding and stripping cylinders operate.

The feeding cylinder 7 is constructed in a manner such as to ensure a uniform distribution and even feed of the vines to the picking cylinder. With this in view, the teeth 27 of the said cylinder are arranged in rows spirally, note Figs. 1 and 6. The teeth may be cast in individual units on hubs, one of which is indicated at 27a, said hubs being fixed on a shaft 28 mounted in end bearings 29.

The picking cylinder, note Figs. 1 and 5, is constructed with a view toward efficiency while maintaining simplicity and ease in accessibility and assembly. Referring to the cylinder in detail, the latter comprises end spiders 30 which are mounted on shaft 31. The rims of the spiders 30 have connected thereto a series of tooth carrying rods or bars 32 having fixed thereon a series of teeth 33. These teeth are preferably made of spring steel wire or rod stock with one length of wire constituting a pair of teeth. In the preferred construction, a length of spring wire or rod stock is shaped in the form of a coil which will fit around its supporting rod 32 with the convolutions of the coil spaced at the center and looped around an anchor bolt 34 fixed to the rod 32. The free ends of each coil are projected outwardly to provide teeth 33. The teeth are preferably inclined at their bases away from the direction of rotation and at their outer extremities extend substantially radially. The teeth may be tempered so as to maintain their set shape. The rods 32 are detachably fixed at opposite ends to the rims of the spiders 30 by means of bolts 35. This construction renders the teeth readily removable at any time desired for replacement or straightening, while at the same time the assembly may be manufactured with relative ease.

The stripping cylinder 16 which coacts with the picking cylinder to remove the vines therefrom consists of end discs 36, note Fig. 7, which are mounted on a shaft 36b have connected thereto tubular tooth-supporting rods 37 to which are connected rows of teeth 38. The teeth preferably are formed with stop shoulders 38a at their bases, the base extremity of each tooth being projected through its supporting rod or pipe and detachably secured in place by lock nuts 38b.

The concave or stripping screen 9 and the feed table 5 are clearly shown in Fig. 3. The openings 10 in the concave 9 are each formed with tapering tail slots 10a, the body of the nuts dropping through these pear-shaped holes while the stems or vines are caught in the slots 10a due to the action of the picking cylinder and separated from the nuts. Retarding pins 39 project through slots 40 at the rear extremity of the concave, the pins 39 being disposed in rows on a rod 41 mounted for arcuate adjustment in bearings 41a. At one end, the rod 41 projects through the side wall of the machine and is provided with an adjusting member 41b, note Fig. 2, whereby the retarding teeth or pins 39 may be adjusted angularly to obtain the most effective picking action in accordance with the condition of the vines. Other groups of retarding pins 42 are provided and project through the pear-shaped openings 10 of the concave, said pins 42 being mounted on supporting rods 43 having exteriorly accessible adjusting members 43a connected thereto in a manner similar to the rod 41. There are thus in effect three groups of pins, 24, 39 and 42, groups 24 and 42 coacting with the picking cylinder 8 and group 39 coacting with the stripping cylinder 16, note particularly Fig. 1.

Figs. 8 to 11, inclusive, show the construction of the cleaning and stemmer drum. The receiving portion of this drum is preferably made up of a series of wheels or spiders, one of which is generally indicated at 44, and each comprising a hub 44a having spokes 44b projecting radially therefrom with each spoke set at an angle so that when it is mated with the adjacent spokes of the series of wheels it will define a substantially spiral conveyor for propelling the nuts forwardly to the cleaning section of the drum as the latter revolves. The rims 44c of each one of the small drums or wheels which go to make up the complete drum are spaced so as to allow slots or openings between the edges of adjacent rims, and in these slots a series of stemmer saws 45 operate. The spokes 44b when arranged in the manner shown minimize breakage of the shells of the nuts while the latter are being stemmed, and to further minimize such breakage, a series of deflector wings 46 are provided between the outer end of each spoke and the adjacent rim, the wing preferably being of triangular shape and serving as a deflector or guard which prevents the nuts from being rolled and crushed by the stemmer saws when the nuts are flung outwardly by centrifugal force against the inner wall of the drum. The hubs 44a of the small drums or wheels 44 are secured on a shaft 47 which is mounted in end bearings 48. The stemmer saws are mounted on shafts 49 which extend through bearings 50 and are provided at their outer ends with sprockets 51 which have a drive connection with a sprocket 52 on the one end of the shaft 47.

Connected to and rotatable with the stemmer drum is a cleaning section 53 of open construction to allow the dirt and stems to be separated from the nuts at this point; and beyond this section is a delivery section 54 provided with a series of paddles 54a which operate to deliver the nuts into a discharge hopper 55.

The outlet duct 19a for the air blast unit discharges against a series of baffles 56 and 57, the baffle 56 being disposed to direct the blast through the peanuts as they fall from the rear end of the pan 11 through separation fingers 11a and into the hopper 12, while the baffle 57 directs the remaining air upwardly and outwardly so as to discharge the vines and other matter progressing rearwardly on the vine rack 17.

The drive from a suitable power source may be applied to pulley wheel 58 and thence transmitted to fan sheave 59, the latter being mounted on shaft 60 which projects through the machine and transmits the drive to fan sheave 61 for the suction fan 22. The drive is also transmitted from main drive pulley 58 through shaft 36b to sheave 62 and thence to pulley 63 secured on picking cylinder shaft 31. From the shaft 31 the drive is taken by sprocket 64 and transmitted to sprocket 65 secured on the feeding cylinder shaft 28. The stemmer and cleaning drum shaft 47 has secured thereon bevel gear 66 meshing with gear 67, the latter gear being mounted on a shaft 68 having a drive connection with sheave 64 on the picking cylinder shaft 31.

In connection with the drive on the picking cylinder 8 and the feeding cylinder 7, it is important that there be a certain ratio of speed maintained between these cylinders. This ratio should be such that the feeding cylinder 7 will run at a slow speed with respect to the speed of the picking cylinder 8 so that the tangs of the feeding cylinder will hold the vines while the nuts are being removed by the teeth of the picking cylinder. In practice, a speed of 11 to 18 R. P. M. for the feeding cylinder and 70 to 100 R. P. M. for the picking cylinder has been found effective. Actual experience has demonstrated that approximately 90% of the nuts can be removed at this point. This method also materially produces damage to the nuts while being removed. The spiral arrangement of the teeth of the feeding cylinder ensure an even feed of the vines which further improves the efficiency of the machine at this stage of the picking operation.

The operation in general will be obvious from the drawings taken in conjunction with the foregoing description. Briefly, the vines with the nuts thereon may be disposed on the feed table 5 where they are taken by the slowly revolving feeding cylinder 7 which carries the vines around into operative relation with the teeth of the picking cylinder 8, the feeding cylinder exerting a holding action on the vines as the teeth of the picking cylinder rake the nuts therefrom. After the vines have been carried part way around on the feeding cylinder, they are stripped therefrom by the teeth of the picking cylinder and carried around over the concave 9, the groups of retarding teeth 24 and 42 coacting with the concave also serving to hold and retard movement of the vines over the concave, and during which time the teeth of the picking cylinder are constantly raking the remaining nuts from the vines. As the vines pass over the concave, the pear-shaped openings 10 of the latter also materially assist in the stripping action since the nuts drop into these openings and the stems engage in the tail slots 10a and are thus more readily separated from the nuts. As the picking cylinder carries the vines upwardly they are stripped therefrom by the stripping cylinder 16, the teeth 39 coacting with the stripping cylinder to further ensure complete stripping of the nuts from the vines. The nuts stripped at this point roll back into the dipped portion of the concave and the vines are thrown by the stripping cylinder onto the vine rack 17, which is of open construction and is constantly being shaken or oscillated to advance the vines rearwardly and cause any loose nuts to sift down onto the nut pan 11. The pan 11 is also being constantly oscillated so as to jar sand and dirt from the nuts and progress the latter to the rear end of the pan where they drop into the hopper 12 and thence pass into the cleaning and stemmer drum 13, which advances the nuts forwardly into the cleaner section 14 where the stemmer saws catch and cut off the stems of the nuts as well as remove fragments of vines through the slots as the saws operate. As the drum revolves, the peanuts are made to pass over the saws repeatedly, and the teeth of the saws are preferably curved inward at the points of the teeth so as to further ensure against injury to the peanuts. Due to the guards 46 adjacent the outer ends of the conveyor spokes 44b, the nuts are prevented from jamming at this point and being rolled and crushed by the stemmer saws. The drum is preferably set at an incline towards its discharge end, and this together with the angular set of the spokes ensures a constant progressing action of the nuts through the drum. The nuts then pass into the revolving cleaner section 14 of the drum, which rolls the nuts and removes the last traces of sand. From this section, the nuts empty into the delivery section 15 which delivers the nuts to the hopper 15a.

The suction fan 22 constantly exerts a suction action through the feed table 5 and also through the concave 9, drawing the dust and dirt carried in by the vines and nuts not only from the table, but also from the entire head chamber 6. This is an important feature, since in prior known peanut picking machines the relatively large amount of dust and dirt carried into the machine resulted in rapid wear and deterioration on running parts and also made work around the machine extremely disagreeable as well as detrimental to the health of the operators.

The air blast duct 19a directs the blast against baffle 56, which in turn directs it upwardly through separation fingers 11a, so that as the material leaves the pan 11 at the rear extremity thereof, the vines and leaves are blown out of the rear end of the machine, the baffle 57 also directing the air upwardly to assist in discharging the vines from the vine rack 17.

The bearings of the cylinders and other rotating parts are preferably housed as illustrated in Fig. 8, a sealed housing 69 being provided which seals the bearings against the entrance of dust and dirt, and ensures long life to the bearings. Since the design of the machine is such as to provide for relatively slow rotation of the respective cylinders, the remaining parts operate at proportionate low speed, thereby further adding to the life of the bearings and the remaining parts of the machine and rendering the latter light running and capable of operation by a small tractor or the like.

Actual experience has demonstrated that the improved machine will remove from 97 to 99% of the nuts from the vines, the number of broken or cracked shells varying from one-half of one percent to two percent.

It will be understood that certain changes in construction and design of the machine in general as well as the respective parts thereof may be adopted without departing from the spirit or scope of the invention as defined by the appended claims.

What is claimed is:

1. In a peanut picking machine, a picking cylinder, a stripping screen or concave bed coacting with said cylinder, a casing providing a chamber in which said cylinder operates, a feed table of open-work construction, and means for creating a suction through said table and also through at least a portion of said screen to thereby withdraw dust and dirt from beneath the vines as they are fed to the picking cylinder over said table and also while being operated on by said cylinder.

2. In a peanut picking machine, a picking cylinder, a stripping screen coacting with said cylinder, a feed table having openings therethrough on which the vines are disposed when being fed to said picking cylinder, and a suction fan in suction communication with said table and said screen and whereby dust and dirt is removed from beneath the vines as they are fed to said cylinder and also while being operated by said cylinder and screen, and means for conducting the dust and dirt so removed to a point remote from the machine.

3. In a peanut picking machine, a picking cylinder, a stripping screen coacting with said cylinder, a casing providing a chamber in which said cylinder operates, means for supporting vines fed to said cylinder, means for creating suction beneath and through the vines on said supporting means and also through at least a portion of said screen to thereby withdraw dust and dirt from the vines by suction assisted by gravity as the vines are fed to the machine and also while being operated on by said cylinder, and means for conducting the dust and dirt so removed to a point remote from the machine.

4. In a threshing machine, a cylinder, a casing providing a chamber in which said cylinder operates, a screen below said cylinder, a feed table of open construction, suction means arranged to create a draft of air downwardly through said table and screen to remove dust and dirt by suction assisted by gravity from material fed to said cylinder, and means for conducting the dust and dirt so removed to a point remote from the machine.

5. In a peanut picking machine, a picking cylinder having teeth thereon, a feeding cylinder having teeth adapted to coact with the teeth of the picking cylinder, means for rotating said cylinders in the same direction, the teeth of the feeding cylinder being curved in a direction counter to the direction of rotation of the cylinder, said cylinder-rotating means being arranged to rotate the feeding cylinder at a low speed with respect to the speed of the picking cylinder and said picking cylinder being of materially greater overall diameter than the feeding cylinder.

6. In a peanut picking machine, a picking cylinder having teeth thereon, a concave bed located adjacent to and coacting with the picking cylinder, said concave bed including an arcuate substantially rigid section of sheet material having therein a series of closely spaced stripped openings, each of said openings having an enlarged rounded leading portion through which the nuts pass and a gradually converging communicating tail slot in which the stems of the nuts engage.

7. In a peanut picking machine, a picking cylinder having teeth thereon, a concave bed located adjacent to and coacting with the picking cylinder, said concave bed including an arcuate substantially rigid section of sheet material having therein a series of closely spaced stripper openings each of which has an enlarged leading portion of rounded contour through which the nuts pass and a gradually converging communicating tail slot in which the stems of the nuts engage, and a plurality of pins projecting upwardly from said section between said openings and constituting retarding means which coact with the teeth of the picking cylinder.

8. In a peanut picking machine, a feeding cylinder, a picking cylinder, a stripping screen or concave bed coacting with said picking cylinder, a casing providing a chamber in which said cylinder operates, a feed table of open-work construction, means for creating a suction through said table and also through at least a portion of said screen to thereby withdraw dust and dirt from beneath the vines as they are fed to the picking cylinder over said table and also while being operated on by said cylinder, and means for rotating said feeding and picking cylinders in the same direction whereby their contiguous portions rotate in reverse directions.

DANIEL F. GOOD.